*Furbush & Crompton.*
*Jacquard Motion for Loom.*
N°11,956.     Patented Nov. 14, 1854.

UNITED STATES PATENT OFFICE.

GEO. CROMPTON AND M. A. FURBUSH, OF WORCESTER, MASSACHUSETTS.

ROLLER FOR PATTERN-CHAINS FOR LOOMS.

Specification of Letters Patent No. 11,956, dated November 14, 1854.

*To all whom it may concern:*

Be it known that we, GEORGE CROMPTON and MERRILL A. FURBUSH, of Worcester, in the county of Worcester and State of Massachusetts, have made certain new and useful Improvements in Rollers of Pattern-Chains for Looms, of which the following is a full, clear, and exact description, reference being had to the annexed drawings, making part of this specification, in which—

Figure 1:
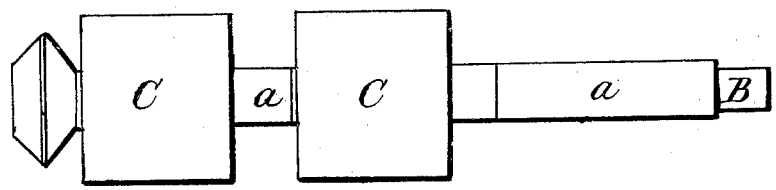
Figure 2:
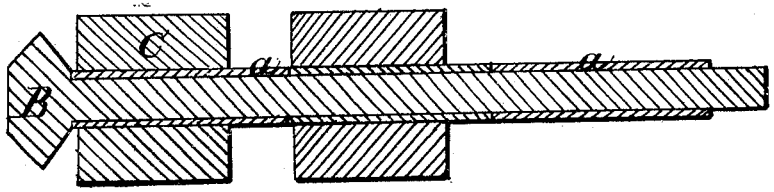
Figure 3:
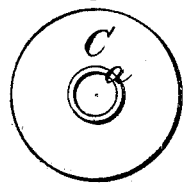
Figure 4:
Figure 5:
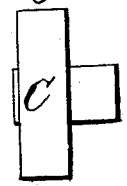

Figure 1 is an elevation of two of the rollers upon the spindle on which they are cast. Fig. 2 is a longitudinal section through the same. Fig. 3 an end view of one of the rollers. Fig. 4 an end view of one of the tubes upon which the rollers are cast. Fig. 5 a view of one of the rollers of the smallest size.

Heretofore it has been customary to cast pattern chain rollers solid and subsequently to turn them down to a uniform length the hole through the center being bored to accommodate the rod upon which the rollers were strung.

The object of our present improvement is to do away with both these operations and to enable us to use a roller which shall require no further labor than is necessary to dress off its rough surface, and our invention consists in arranging the rollers upon a previously formed wrought iron tube which is made of the exact length necessary to bring the rollers when strung upon the rods into the required positions.

To enable others skilled in the art to make and use our invention we will proceed to describe the manner in which we have carried it out.

In the first place wrought iron tubes of a size and thickness represented at $a$ of the accompanying drawings are prepared; the mold for casting the rollers having been prepared these tubes are strung upon a rod of the size of one of the carrying rods of the chain, and inserted in the mold. The rollers C, are then cast upon the tubes as seen in Figs. 1 and 2, the tube being allowed to project upon one side of the mold a distance sufficient to keep the rollers at the required distance apart when strung upon the rods of the chain, without the use of washers, extra tubes or other similar contrivances for the purpose of adjusting their position on the rods.

It will be perceived that rollers thus constructed will possess many advantages, independent of the economy of their original construction, over those heretofore in use, firstly owing to the exact and unvarying length of the tubes $a$, each roller finds it proper position, upon the rods of the pattern chain without the use of the washers or short tubes heretofore employed; secondly, the length of bearing of the rollers upon their carrying rods is much increased which is an important item particularly with the narrow rollers the bearing of which is thereby doubled as seen in Fig. 5.

We do not claim as new the process of uniting cast and wrought iron by casting the one upon the other, neither do we claim any metallurgic process whatever, but—

What we do claim as our invention and desire to secure by Letters Patent is—

The within described improvements in pattern chain rollers, a wrought iron tube being made use of for the bearing of the roller, the body of the roller being secured thereto by casting in the manner set forth, whereby the rollers, when strung upon the chains, are caused to fall into the exact positions required to operate the hooked jacks, without the necessity of gaging and turning down the roller as has heretofore been done.

GEO. CROMPTON.
M. A. FURBUSH.

Witnesses:
CHARLES PRATT,
JOHN H. MATTHEWS.